United States Patent
Ito

(10) Patent No.: US 7,274,475 B1
(45) Date of Patent: Sep. 25, 2007

(54) IMAGE RECORDING AND REPRODUCING DEVICE, METHOD AND MEMORY MEDIUM READABLE WITH COMPUTER

(75) Inventor: Masamichi Ito, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/239,016

(22) Filed: Jan. 29, 1999

(30) Foreign Application Priority Data

Jan. 30, 1998 (JP) .............................. 10-019120
Jan. 27, 1999 (JP) .............................. 11-017994

(51) Int. Cl.
*G06F 3/12* (2006.01)
*G06K 1/00* (2006.01)

(52) U.S. Cl. ................. 358/1.15; 348/307.2; 358/3.28; 358/302

(58) Field of Classification Search .......... 358/1.1–1.9, 358/1.11–1.18, 1.15, 3.28, 302, 527, 306; 709/211–212, 213–238, 323; 382/233, 232, 382/100; 346/107.2; 348/207.99, 231.9, 348/209.99, 207.1, 207.2; D16/202; 399/140
See application file for complete search history.

(56) References Cited

U.S. PATENT DOCUMENTS 5,889,868 A * 3/1999 Moskowitz et al. .......... 380/51
6,122,403 A * 9/2000 Rhoads ........................ 382/233
6,226,449 B1 * 5/2001 Inoue et al. ................. 386/120
6,289,167 B1 * 9/2001 Boetje et al. ................. 386/52
6,374,036 B1 * 4/2002 Ryan et al. .................... 386/94
6,377,744 B1 * 4/2002 Wakui .......................... 386/46

OTHER PUBLICATIONS

The American Heritage Dictionary of the English Language, Third edition, Houghton Mifflin Company.*

* cited by examiner

*Primary Examiner*—Aung S. Moe
*Assistant Examiner*—Dillon Murphy
(74) *Attorney, Agent, or Firm*—Fitzpatrick, Cella, Harper & Scinto

(57) ABSTRACT

A camera device includes an image data generation unit which generates image data corresponding to a captured image; a specific information generation unit which generates specific information relating to the image data; a recording unit which records the image data and the specific information on a removable recording medium which is removably attachable to the camera device; a reproducing unit which reproduces the image data and the specific information from the removable recording medium; an embedding unit which controllably embeds the reproduced specific information into the reproduced image data using a digital watermarking technique; and a control unit which controls the embedding unit to embed the reproduced specific information into the reproduced image data if a first process is selected by a user, and controls the embedding unit not to embed the reproduced specific information into the reproduced image data if a second process is selected by the user.

9 Claims, 20 Drawing Sheets

IMAGE RECORDING AND REPRODUCING DEVICE, METHOD AND MEMORY MEDIUM READABLE WITH COMPUTER

BACKGROUND OF THE INVENTION

1. Field of the Invention

The present invention relates to an image recording and reproducing device, the method and a memory medium readable with computer, which are preferably used for recording and reproducing electronic watermark and image data.

2. Related Background Art

Currently, communication technology for various data such as image data utilizing the internet has been rapidly developed and increasingly used. Further, digital satellite broadcasting has been started and digital AV instruments such as DVD and the like have become widespread. Therefore, digitization of image, music etc., is increased and the softwares commercially available to users are mainly based on digital data.

Such digital data images, music softwares and the like can be easily copied and edited by the use of a personal computer. Further, it is also possible to send or communicate unfairly copied data to a unspecified number of the general individuals on the internet. Thus such wide spreading of digital works has arisen new problems from the viewpoints of the piracy and the unfair copy.

The above-mentioned problems were conventionally avoided by jointly using encryption of data, scramble technology or the like, and the penalty system or the like, as a technology for the unfair copy or a security technology on the internet. Alternatively, the unfair copy was prevented by the macrovision system for the software of picture and the CGMS system based on copy generation information. However, these copyright protection technology have both advantages and disadvantages, and no perfect copyright protection technology has been established.

Thus, as the technology of preventing and suppressing the unfair copy, the electronic watermark technology was considered. In this watermark technology, on ID information or information intended by a manufactures are buried in digital works as electronic watermark information which is different to visually recognize with the human eye and is carried while being hidden therein. The watermark effect is realized by burying the watermark information in redundant data portions as a kind of noise. Alternatively, it is also possible to further increase the watermark effect by burying the watermark information in main data portions as well as the redundant data portions.

When this electronic watermark information is used in image data, the buried watermark information is not completely removed even by the data compressing and the file processing, and the watermark information can be continuously held in the image data. As the result unauthorized copying can be prevented.

When the electronic watermarks in the prior art example are used in for example, image data, watermark data is buried in the redundant image portions and the main data portions as noise. Therefore, in the prior art, deterioration of the quality of image is larger than in a case where no electronic watermarks are introduced. However, in order to prevent the deterioration of image quality as much as possible, if a smaller amount of the electronic watermark data is buried in image data, the watermark data can be erased by the file processing. Further, if the master image record and the electronic watermark data were simultaneously buried in image data, the watermark data cannot be separated from the entire data and deteriorated images are recorded.

SUMMARY OF THE INVENTION

The object of the present invention is to prevent the above-mentioned problems.

Another object of the present invention is, without deteriorating the image quality of the recording image itself, to insert electrical watermark in the image in accordance with the user's requirement.

According to the preferred embodiment of the present invention, there is disclosed a device comprising:

record processing means for recording image data in a first recording area of a recording medium and recording specific information in a second recording area of the recording medium;

reproducing processing means for reproducing the first and second recording areas; and conversion means for converting the reproduced specific information to electric information, which is difficult to visually recognize, so that the electric information is selectively combined with the image data.

Still another object of the present invention is to output watermark data-buried image when user requires in subjecting electronic watermark processing to the image user recorded, so that the original recording image itself can be maintained with the image quality not deteriorated.

Still another object of the present invention is to provide electronic watermark in image data in simple structure.

Another object of the present invention is to provide a method of forming new electronic watermark.

Other objects and features of the present invention will become apparent from the description of following examples and the drawings.

DETAILED DESCRIPTION OF THE PREFERRED EMBODIMENTS

First Embodiment

Figure 1:
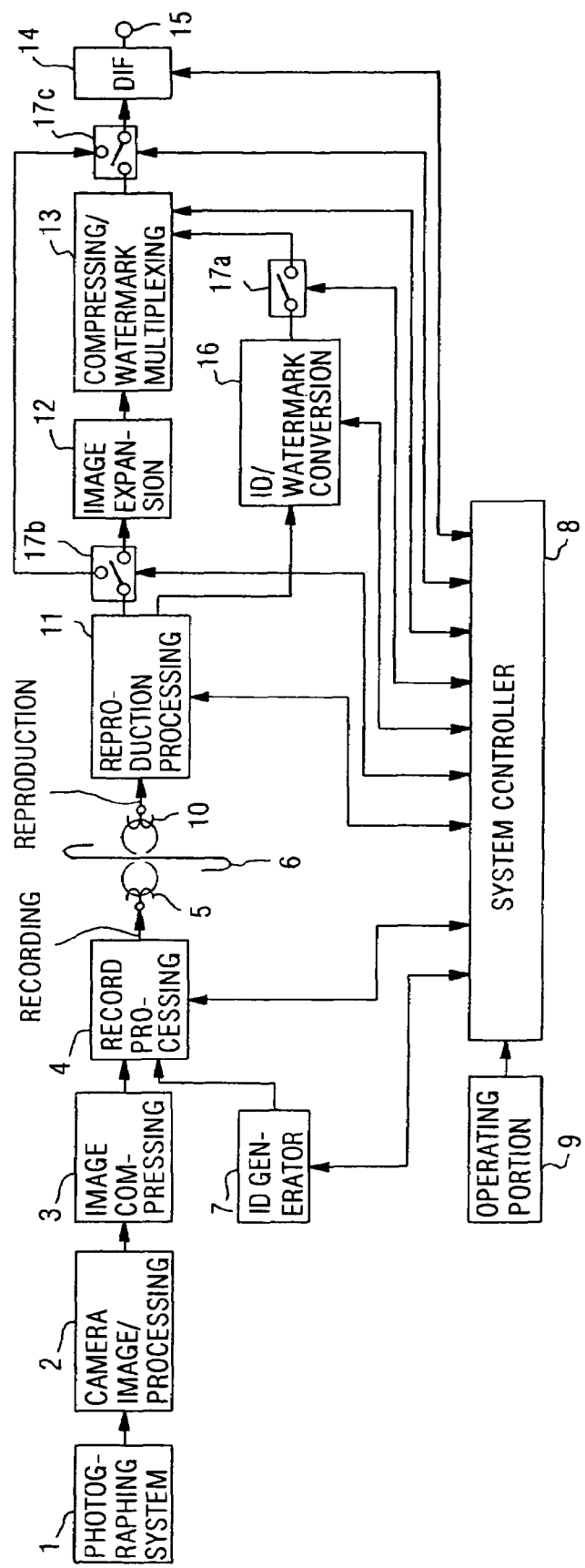
FIG. 1 is a block diagram of a digital image recording and reproducing device of an embodiment according to the present invention.

FIG. 1 is a block diagram showing constitution of a digital image recording and reproducing device of an embodiment according to the present invention. In FIG. 1, the reference numeral 1 denotes a photographing system including a lens, a CCD etc., 2 a camera image processing circuit which processes signals from the photographic system to change the signals to a compressible form, 3 an image compressing circuit which is a DV compressing circuit preferably known as the compression method in the digital video, 4 a record processing circuit, 5 a recording head, 6 a magnetic tape, 7 an ID generating circuit for information buried as electronic watermark, 8 a system controller, 9 an operating portion where user performs various indicating inputs, 10 a reproduction head, 11 a reproduction processing circuit, 12 an image expansion circuit, 13 a multiplexing portion which multiplexes the compressing circuit and electronic watermark information into video data, 14 an IEEE 1394 system digital interface (DIF) for example 15, a cable terminal for connecting an external apparatus, 16 a data conversion circuit for converting ID data output from the ID generating circuit to watermark information, and 17a, 17b and 17c each, interlocking switch.

Next, the operation of the digital image recording and reproducing device will be described. First, during recording, photographing processing of images to be photographed are performed by the photographing system 1. Then the photographed images are digitized in the camera image processing circuit 2 and the brightness and color are controlled. The processed camera image data is compression coded, based on a desired compression system algorism by the image compressing circuit. In this compression, the data is band compressed by a DV compression system using a DCT and VLT which are used as a band compression system in a home digital video. The compressed image data is converted to a form suitable for recording in the record processing circuit 4 and is rendered in a desired area of the magnetic tape 6 from the recording head 5.

Further, an ID for watermark information, such as time information recorded image data, content information which is required by user, works information or the like is appropriately generated by the ID generating circuit. The watermark information is accorded to image data recorded and to a desired position in the image timely. This ID is used as a source of electronic watermark information (specific information) to be buried in the image data at its output. The generated ID is converted to a form suitable for recording in the record processing circuit 4 and is recorded in a desired area of the magnetic tape 6 from the recording head 5. In the magnetic tape 6, the image data and the ID data are recorded in different areas. The generation and recording of this ID are simultaneously performed together with image recording operation. In the record processing circuit 4 and the recording head, the compressed image data are appropriately separated from ID data and the respective data are controlled to record on desired areas separately.

In the reproduction of the data, the image data and ID recorded on the recording tape 6 are reproduced by the reproduction head 10. The reproduced image data and ID data are converted from a condition suitable for recording to a usual condition, and the image data and the ID are allocated, by the reproduction processing circuit 11.

The operation of three switches 17a, 17b and 17c will now be described. All of the switches are operated interlockingly with each other. In the output on user's demand, all of the switches are adapted to be simultaneously effected when watermark information is multiplexed onto image data and when only, image data are output without multiplexing.

When switching control is executed so that no watermark information is multiplexed onto the image data, reproduced image data are transmitted from the switch 17b to the switch 17c and output from the DIF 14 to an external device sequentially. When switching control is effected so that the watermark information is multiplexed onto the image data, the reproduced image are transmitted to the switch 17b connected to the image expansion circuit 12 so that all of the previously DV compressed image data or a part thereof by expanded by the image expansion circuit 12.

On the other hand, reproduced ID is converted to a form suitable for multiplexing onto image data as electronic watermark by the ID/watermark information conversion circuit 16. When switching control is executed so that watermark information is multiplexed, the watermark information converted from ID is transmitted to the compressing and watermark multiplexing portion 13 through the switch 17a.

In the compressing and watermark multiplexing portion 13, the watermark information are multiplexed onto all or a part expanded image data at required positions, while again performing the same DV compression processing as in the image compressing circuit 3. A position where watermark information is buried can be selected to a required position by position information which the watermark information has an ID and by redundancy of image. A circuit for compressing data in the compressing and watermark multiplexing portion 13 may use a part or all of the image compressing circuit 3.

The image data output from the compressing and watermark multiplexing portion 13, which passes through the switch 17c connected to the sides of the image compressing circuit 3 and watermark multiplexing portion 13, is output from the DIF 14 via the terminal 15 to the external device by means of a cable. In this case, the DIF which uses an IEEE 1394 serial bus can be considered.

Data transmission in a DIF and home digital video will be additionally described. In the standards of home digital video, DIF uses a system based on the standards of the above-mentioned IEEE 1394 serial bus. Although no reference numerals are shown, FIG. 8 shows the constitution of a source packet in a home digital video.

Figure 8:
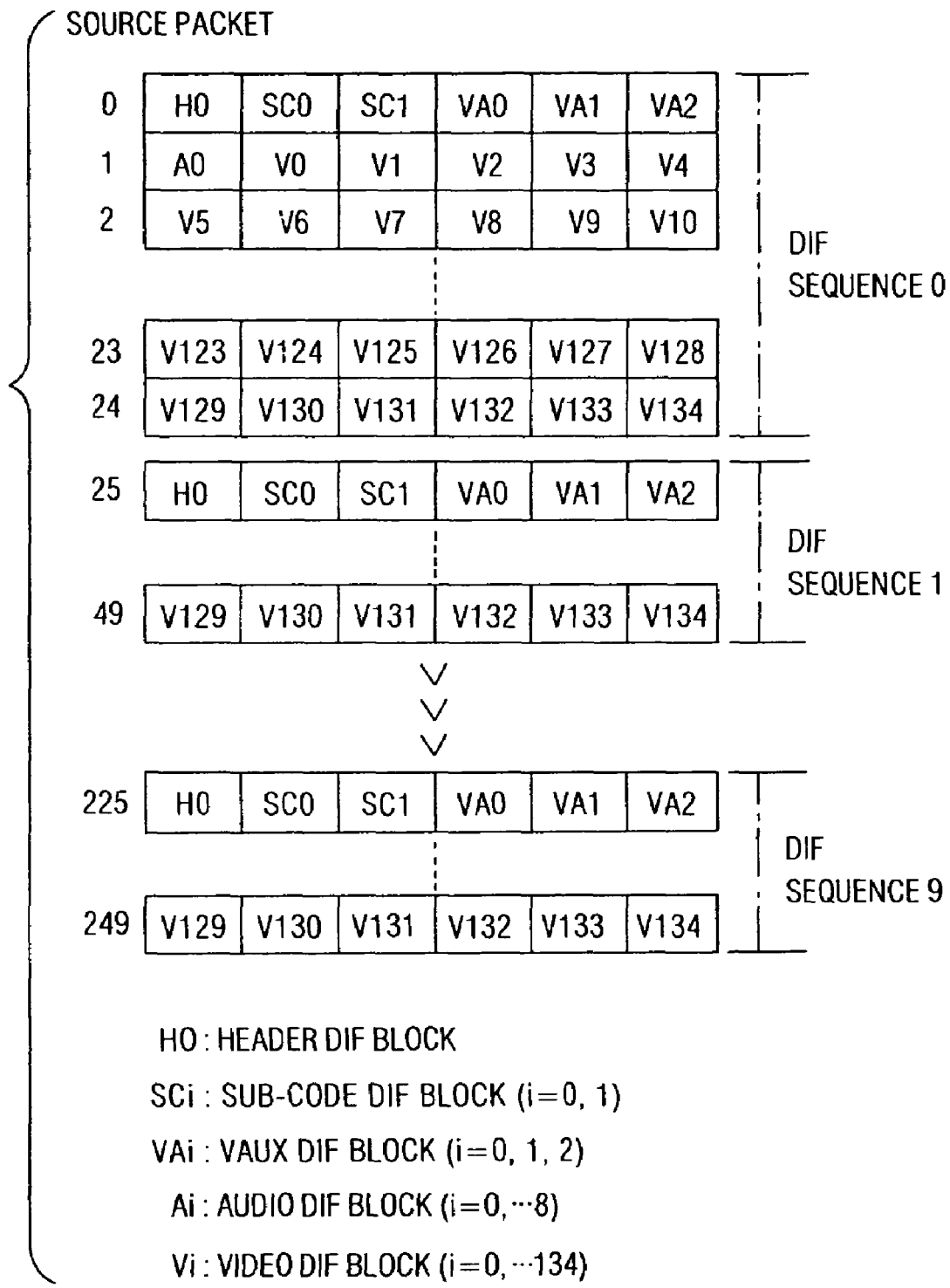
FIG. 8 is a constitutional view of a source packet in a home digital video.

Each of DIF sequences 0 to 9 in FIG. 8 correspond to actual data contents for one track, which were recorded in a magnetic tape. A section having DIF sequences 0 to 9 forms DIF data for one frame. H0 in FIG. 8 is a header DIF block. Each of the DIF sequences has one H0 block only. SC is a sub-code DIF block. Each of the DIF sequences has two SC blocks. VA is a video AUX DIF block. Each of the DIF sequences has three VA blocks. A is an audio DIF block. Each of the DIF sequences has 9 A blocks. V is a video DIF block. Each of the DIF sequences has 135 V blocks. The video data in FIG. 8 have been DV compressed. As for the number of source packets, one DIF sequence has 25 packets using 6 DIF blocks as one unit, and 10 DIF sequences for one frame have 250 packets in total.

In the present embodiment, the watermark information burying processing, which was computed based on ID of reproduced sub-code data, has already been performed onto reproduced image data. Thus, in a desired portion of the video DIF block of the source packet in FIG. 8, where watermark information should be buried, watermark information is buried.

Figure 9:
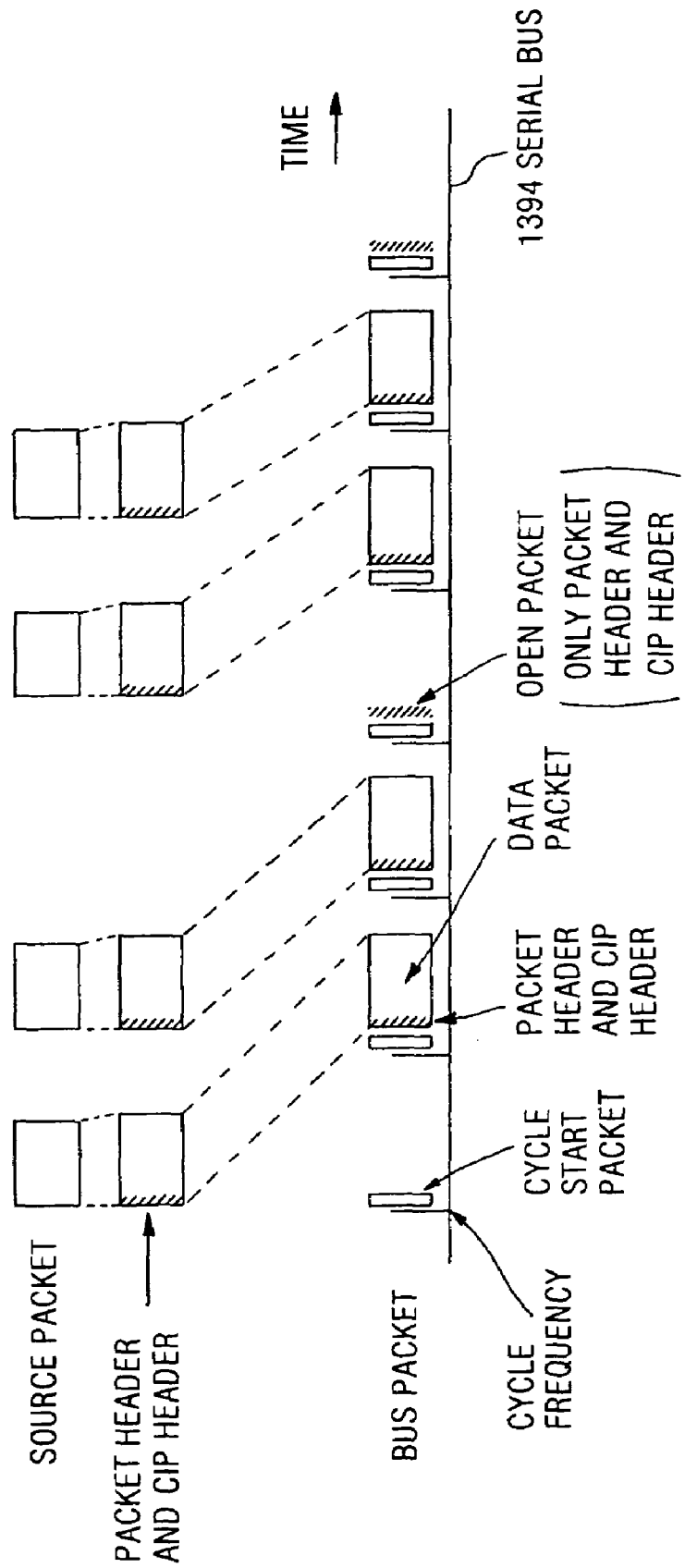
FIG. 9 is a constitutional view showing transmission model of the source packet.

The transmission of the DIF data explained by FIG. 8 will be then described with reference to FIG. 9. FIG. 9 is a transfer model illustrating a state where source packets in a home digital video (DVC) are transmitted by a data bus, that is an IEEE 1394 serial bus.

In FIG. 9 each of packets is a packet composed of 6 DIF blocks as explained by the use of FIG. 8. Thus, as for the number of source packets, one DIF sequence contains 25 packets, and DIF data for one frame contain 250 packets.

Further, in DVD, an AV (or AV/C) protocol which is used in the 1394 serial bus, is used. In the AV protocol, the read-time data transfer protocol using an isochronal data transfer via the 1394 serial bus and the isochronal data flow control are defined. Further, in the AV protocol, a common isochronal packet (CIP) is also defined for the real-time transfer of the AV data. Therefore, in addition to header and AV (real-time) data, CIP header transfer is also transferred as a part of AV data.

FIG. 9 also shows a state where an isochronal packet header and a CIP header are added to a source packet and these headers are incorporated and transferred in the 1394 serial bus as an isochronal packet.

Although the cycle frequency of FIG. 9 that is the cycle in the 1394 serial bus, may generates delay or time lag, it is 125 µs basically. Using the time as a reference, a cycle start packet is generated and divided in each cycle. As shown in FIG. 9, after header-added source packets were stored in each cycle as isochronal packets, they are being transferred. In actual transfer on the 1394 serial bus, in addition to the isochronal transfer, asynchronal transfer, other isochronal transfer, or isochronal and asynchronal transfer between other nodes or the like are generated.

Under the standard of DVC, each of the isochronal packets has a fixed length and when data should be transferred, data having a desired length per cycle, that is the length of a one source packet, a packet header and a CIP header is transferred. Even if there is no need of data transmission, an open packet with a packet header and a CIP header is still transferred. In the packet header, various information having data length or the like based on the 1394 standard is stored at a desired position. In the CIP header, counted values of blocks which are used for the detection of data block vanishment during packet transfer, and flag indicating data code and the like are stored. Data transmission from DIF 14 to the external device is carried out in such transmission manner.

Referring to FIG. 1 again, switches 17a, 17b and 17c are operated interlockingly with each other, on user's demand, as described above. Thus watermark information is multiplexed onto image data by connecting the switches to each other if necessary, and the watermark-multiplexed image data can be output. If no multiplexing of watermark information thereto is required, the connection of switches is released, whereby only image data can be output.

The system controller 8 in FIG. 1 controls ID generation for watermark in the ID generation circuit 7, the record processing circuit 4, the reproduction processing circuit 11, the ID/watermark information conversion circuit 16, interlocking switching of the switches 17a, 17b and 17c, the compressing and watermark multiplexing portion 13, DIF 14, and each inside of the device. If user's judgment or specific instruction necessary, control is made in accordance with indication from the operation portion 9. The operating portion performs selection of ID for watermark which is generated by the ID generation circuit 7, in addition to various indicating inputs.

Although an audio function of the image recording and reproducing device is not described in this embodiment, it should be included in the example as a matter of course.

Figure 2:
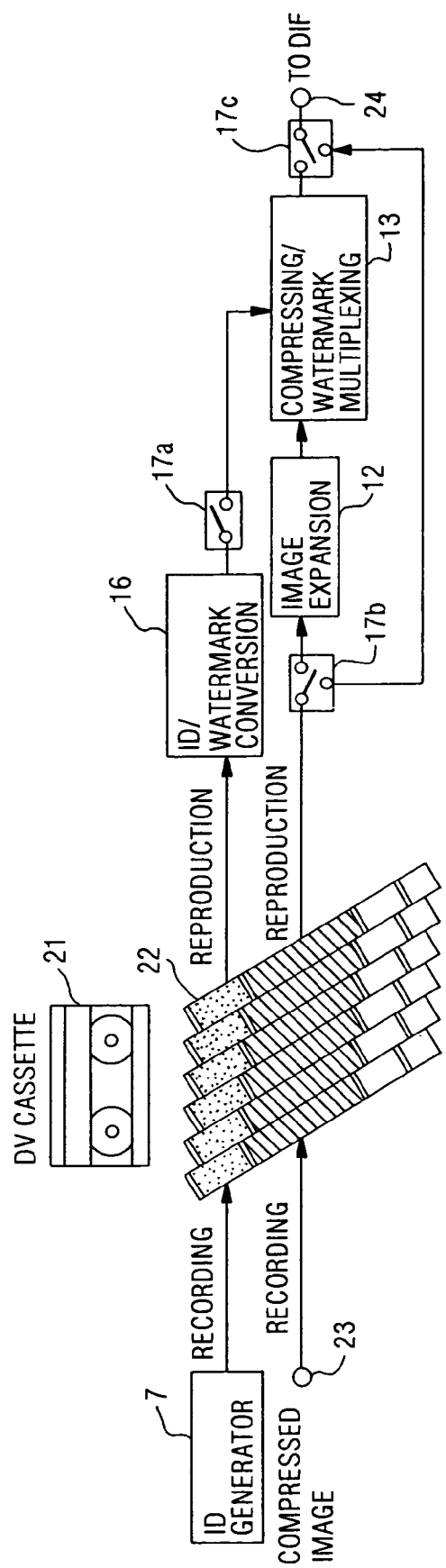
FIG. 2 is a constitutional view showing a main portion of a first embodiment of the present invention.

FIG. 2 shows a structure for explaining the main portion of the embodiment. Image data and watermark ID are separately recorded on different recording areas of a magnetic tape.

Before explaining FIG. 2, a data recording system on a magnetic tape in the home digital video shown in FIG. 3 will first be described.

Figure 3:
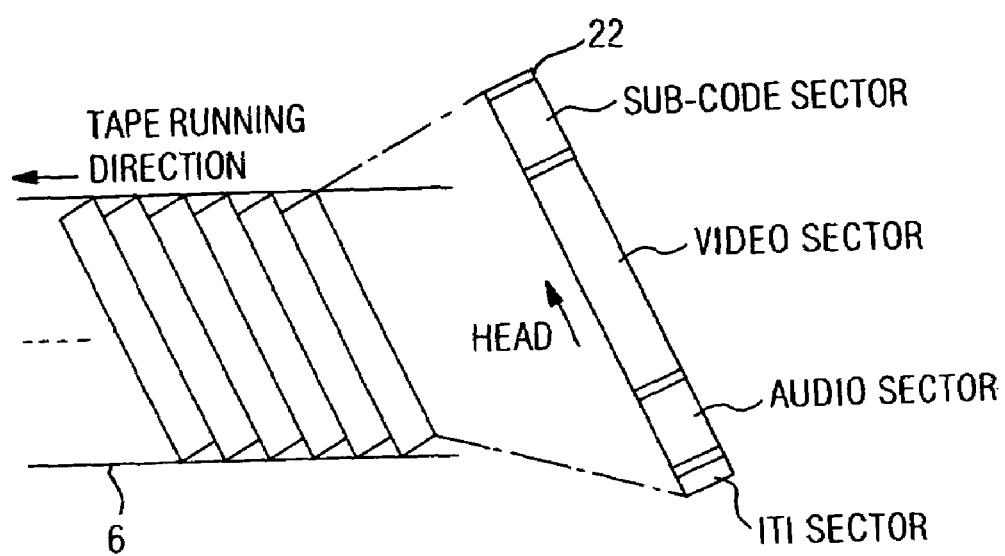
FIG. 3 is a constitutional view explaining a recorded state of various data on a magnetic tape for a home digital video.

In FIG. 3, a track 22 is formed on a magnetic tape 6 in a manner that data for a digital video cassette is recorded on an ITI sector, an audio sector, a video sector and a sub-code sector are recorded on the track in turn from the side header enters. Particularly, in the ITI sector are recorded basic system data such as information relating the track, information relating the start sink and the like. Also in the audio sector are recorded sector ID, audio data, and audio AUX data. In the video sector are recorded sector ID, compressed image data, and video AUX data. Further, in the sub-code sector are recorded sector ID, time code and sub-code data of optional data.

As shown in FIG. 2 based on the recording system as shown in FIG. 3, image data compressed by the home digital video compression (DV compression system) are recorded on video areas and watermark ID are recorded on sub-code areas.

In FIG. 2, the reference numeral 21 denotes DV cassette, 22 a track on a magnetic tape, 23 an input terminal, and 24 an output terminal. Other elements corresponding to the same elements shown in FIG. 1 are denoted by the same reference numerals as in FIG. 1.

DC-compressed image data are sequentially recorded in video recording areas on the track 22 by the recording head not shown while drawing the track 22 on the tape in DV cassette. Further, watermark ID generated by the ID generation circuit 7 are also recorded in sub-code recording areas at a desired timing with respect to image to be recorded.

In the reproduction, image data and ID data are sequentially reproduced by a reproducing head not shown. If watermark is to be multiplexed, a part and all of the reproduced image data from the switch 17b be expanded through the image expansion circuit 12. On the other hand, if no watermark is to be multiplexed, only image data can be output from the switch 17b to the external device through the switch 17c and its output terminal 24 by switching control. Further, reproduced ID data are watermark multiplexing converted by the ID/watermark multiplexing conversion circuit 16, and DV compressed completely, if switch 17a on, by the image conversion circuit 3 and multiplexing portion 13 while burying the watermark information in the image data from the image expansion circuit 12, and output from the output terminal 24 to the external device via DIF 14.

When the present invention has the above-mentioned structure, it can be used without limiting to the image recording and reproducing device shown in FIG. 1.

Second Embodiment

In second embodiment of the present embodiment, the recording of the image data and watermark information ID data can be separately performed on a plurality of recording mediums. Such recording mediums includes a solid memory (RAM), a magnetic tape, or other recording medium combined with disk and RAM.

Figure 4:
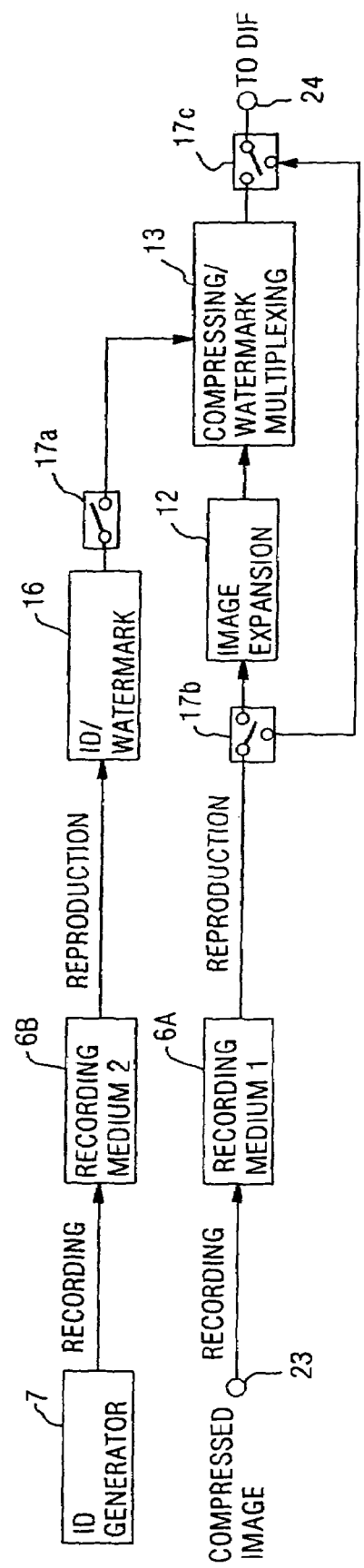
FIG. 4 is a constitutional view showing a main portion of a second embodiment of the present invention.

FIG. 4 shows a second embodiment of the present invention. In FIG. 4 the reference numeral 6A denotes a first recording medium and 6B a second recording medium. Other elements or portions correspond to the same reference portions in FIG. 2. In this embodiment each of the recording mediums 6A and 6B is a RAM.

If the image recording and reproducing device is not a digital video camera or a digital VTR, a MPEG for dynamic image and a JPEG for static image can be used as the compression system of image data in addition to the compression system in the home digital video.

When the MPEG is used as a compression system, MPEG compressed image data is input from an input terminal 23 and recorded on the recording medium 6A based on a predetermined recording format. On the other hand, watermark information ID generated by the ID generation circuit 7 at desired timing are recorded on the recording medium 6B on which image was recorded. In the recording mediums 6A and 6B, recording and reproduction are performed so that recording the image data and ID data, and the read timing are timely matched to each other.

In the reproduction, recorded image data on the recording medium 6A and ID data on the recording medium 6A are sequentially reproduced. When watermark information is multiplexed onto the image data, the image data reproduced in response to the control of each of switches 17a, 17b, and 17c are input from the switch 17b, and a part or all of the image data MPEG compressed by the image expansion circuit 12 be expanded. When watermark information is multiplexed onto image data which is output, image data reproduced in response to the control of three switches 17a, 17b, and 17c are transmitted from the switch 17b to the switch 17c, and only image data can be output from the output terminal to the external device via DIF 14.

On the other hand, reproduced ID data are watermark information converted by the ID/watermark information conversion circuit 16. If the switch 17a is on in order to multiplex watermark information, the ID data are completely MPEG compressed again by the image compression circuit 3 and watermark multiplexing portion 13, while burying the watermark information in image data from the image expansion circuit 12, and output from the output terminal 24 to the external device via DIF.

Figure 5A:
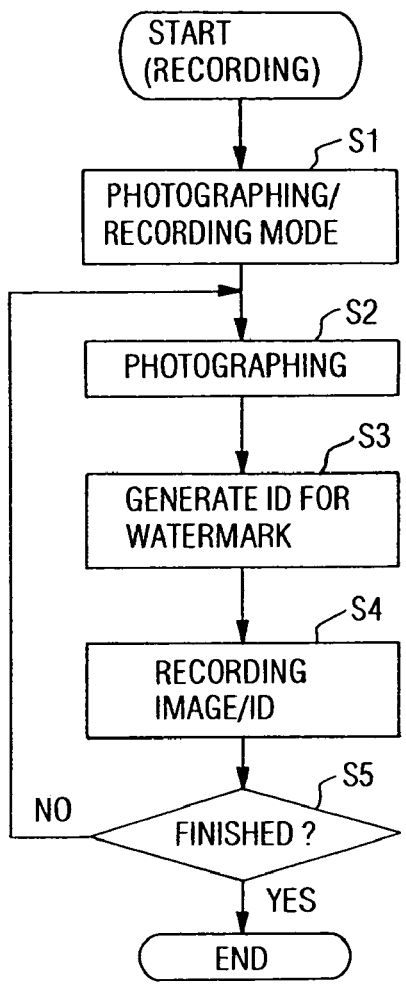
FIGS. 5A and 5B are flow charts showing operation in a first embodiment and a second embodiment, respectively.
Figure 5B:
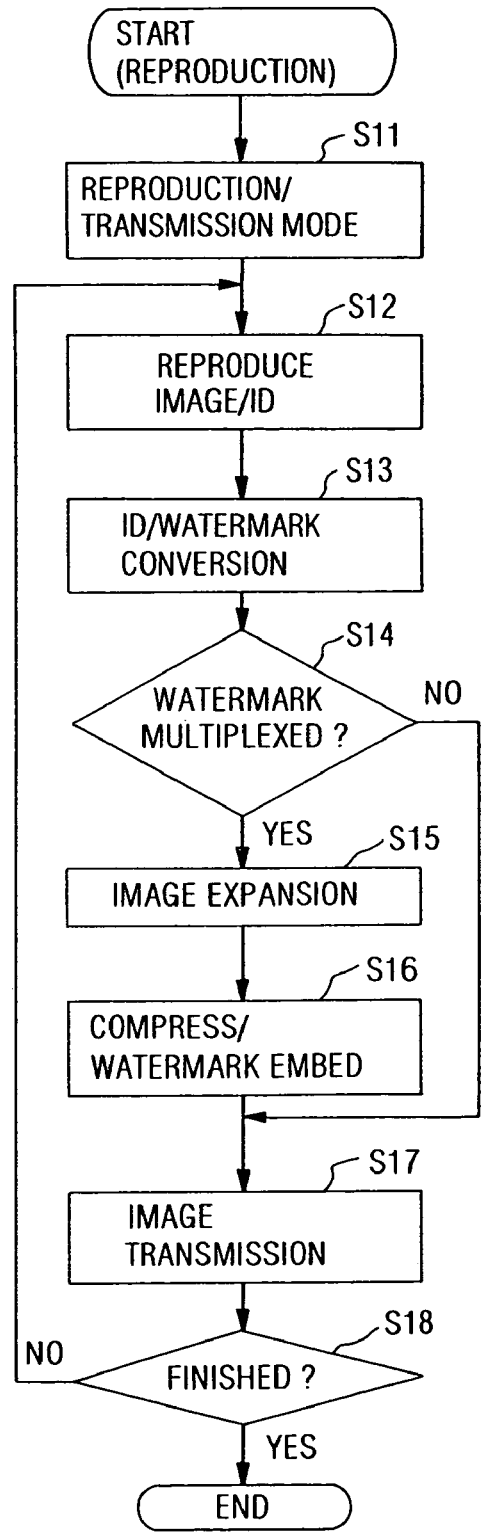

Flow charts showing the flows of operation in the first and second embodiments of the present invention are illustrated in FIGS. 5A and 5B, respectively. Particularly, FIG. 5A is a flow chart for recording operation, and FIG. 5B is a flow chart for reproduction operation.

First, the flow chart of recording operation shown in FIG. 5A will be described. When the image recording and reproducing device is on photographing and recording mode is at step S1, a photographing system starts image photographing in step S2 and prepares recording. Then watermark information ID are generated by the ID generation circuit in step S3. Since the ID are sometimes generated in response to the real-time image or information, it is generated while performing image photographing or recording, in real-time. The watermark information includes information user requires and information for indicating works other than the time information. The image photographed in step S2 and the ID generated in step S3 are separated recorded in step S4. Separate recording of both data is performed by recording both data on different recording areas on the same recording medium, or by recording the respective data on different recording mediums.

Recording of image data and ID in step S4 is continued until the recording of image data in a desired unit is completed or until recording operation is terminated by the user's operation. Upon completion of the recording, the generation and recording of ID is also simultaneously terminated. When one recording is completed, selection of the continuation or completion of photographing/recording mode is made at step S5. When the mode is completed the flow of recording operation is completed. When the mode is continued, the step is returned to step S2 of image photographing to repeat the flow.

Next, a flow chart for the reproduction shown in FIG. 5A will be described.

When the image recording and reproducing device enter the reproduction and transmission mode in step S11, desired image data and watermark information ID recorded at positions associated with the image data are reproduced in step S12 in response to user's instructions. Subsequently, in step S13, the reproduced watermark information ID' are ID/watermark information converted to a form suitable for being buried (multiplexed) in the image data corresponding to watermark information.

When the watermark information is then multiplexed onto the image data and transmitted to the external device in step S14, steps S15, S16. When not multiplexed, steps S17 and S18 are used. Judgment of watermark multiplexing is made by user. When the watermark information is multiplexed expansion processing of image data is performed in step S15. In step S16 the watermark information is buried in the image data whose entire or partial compression is released in step S15 so that the watermark information is mixedly buried by compression processing again by the same compression system. The image data in which watermark information was buried are sent to step S17, and transmitted to an external device.

Most of watermark information are buried in redundant portions of image data and a few watermark information are buried in the main portion thereof, taking the visual properties of human into consideration. The watermark information is buried by methods of burying watermark information in sample values such as waveforms and picture elements, or in values obtained by frequency-conversion of original signal. Since image data used are motion pictures or static pictures, methods of burying watermark information, which are suitable for such pictures are used.

Further, when no watermark information is multiplexed onto image data, no expansion processing is performed.

Thus, only the reproduced, compressed image data are sent to step S17 and transmitted to the external device.

In step S17, image data having multiplexed watermark information or having no watermark information are transmitted to the external device connected to DIF 14. When the transmission of the image data is completed judgment of the reduction/transmission mode for the image data is performed in step S18. Alternatively, when other image data are to be reproduced, they are returned to step S12 and repeat the steps following thereto. When this mode is completed in step S18, this flow is also completed.

Third Embodiment

In a third embodiment of the present invention, a case where watermark information ID is postrecorded on previously recorded image data will be described.

In a home digital video only sub-code area is used for postrecording and the areas on a tape where image were recorded is not used. By using this postrecording scheme, watermark information ID can be recorded. That is, by additionally recording watermark ID data in sub-code areas associated with image data which are recorded in the past, the watermark information ID can be obtained even if the generation and recording of the watermark information ID was not performed at the original recording. The postrecorded watermark information ID can be multiplexed onto image as electronic watermark information during the output of the image data to the external device.

Figure 6:
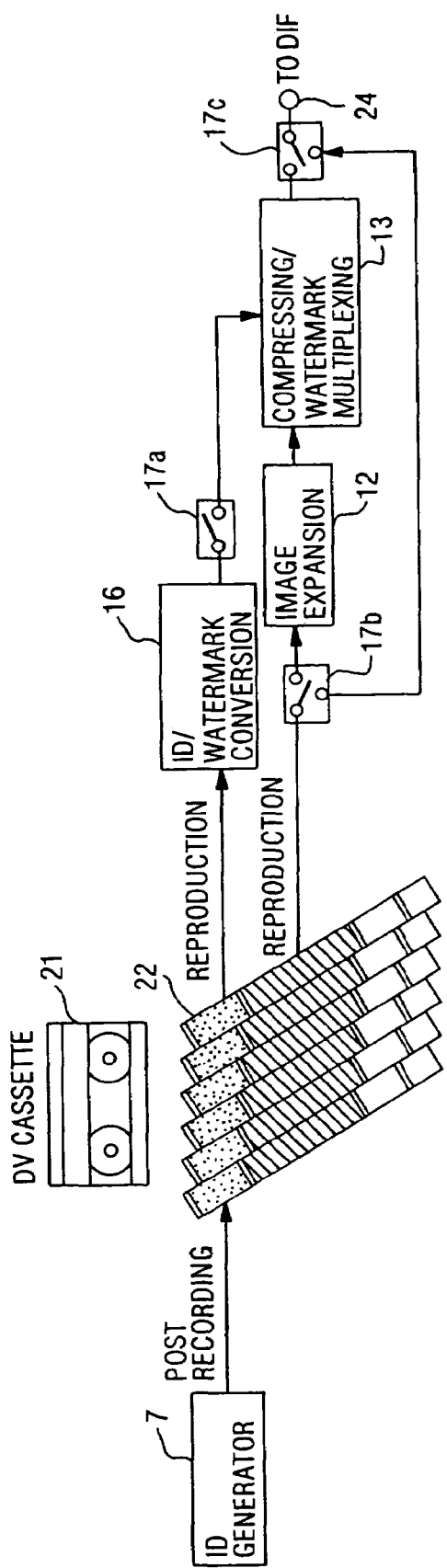
FIG. 6 is a constitutional view showing a main portion of a third embodiment of the present invention.

FIG. 6 shows block diagram of the main portion of the third embodiment for postrecording process. In FIG. 6, portions corresponding portions in FIG. 2 are denoted by the same reference numerals as therein and the descriptions of the portions are omitted.

In FIG. 6, DV compressed image data had already been recorded on image recording areas of tracks 22 of DV cassette tape. Also ID or some other data or no data had been recorded on the sub-code areas of the tracks 22. In postrecording on sub-code areas, watermark information ID composed of information of works user need, which were generated by ID generation circuit 7, continuously or at fixed spaces or in desired timing or in accordance with required image positions, are recorded on the sub-code recording areas with a recording head not shown.

In the reproduction, image data and ID data recorded are sequentially reproduced by a reproducing head not shown. If watermark is to be multiplexed, a part or all of the reproduced image data from the switch 17b are expanded through the image expansion circuit 12. On the other hand, if no watermark is to be multiplexed, only image data can be outputted from output terminal 24 through the switches 17b and 17c. Further, reproduced ID data are watermark multiplexing converted by the ID/watermark multiplexing conversion circuit 13, and DV compressed completely, if switch 17c is on for the purpose of multiplexing, by the image conversion circuit 3 and multiplexing portion 13 while burying the watermark information in the image data from the large expansion circuit 12, and output from the output terminal 24 to the external device via DIF 14.

In the third embodiment, not only postrecording on divided sub-code areas of a magnetic tape but also postrecording using plural recording mediums as in the second embodiment can be performed.

Figure 7:
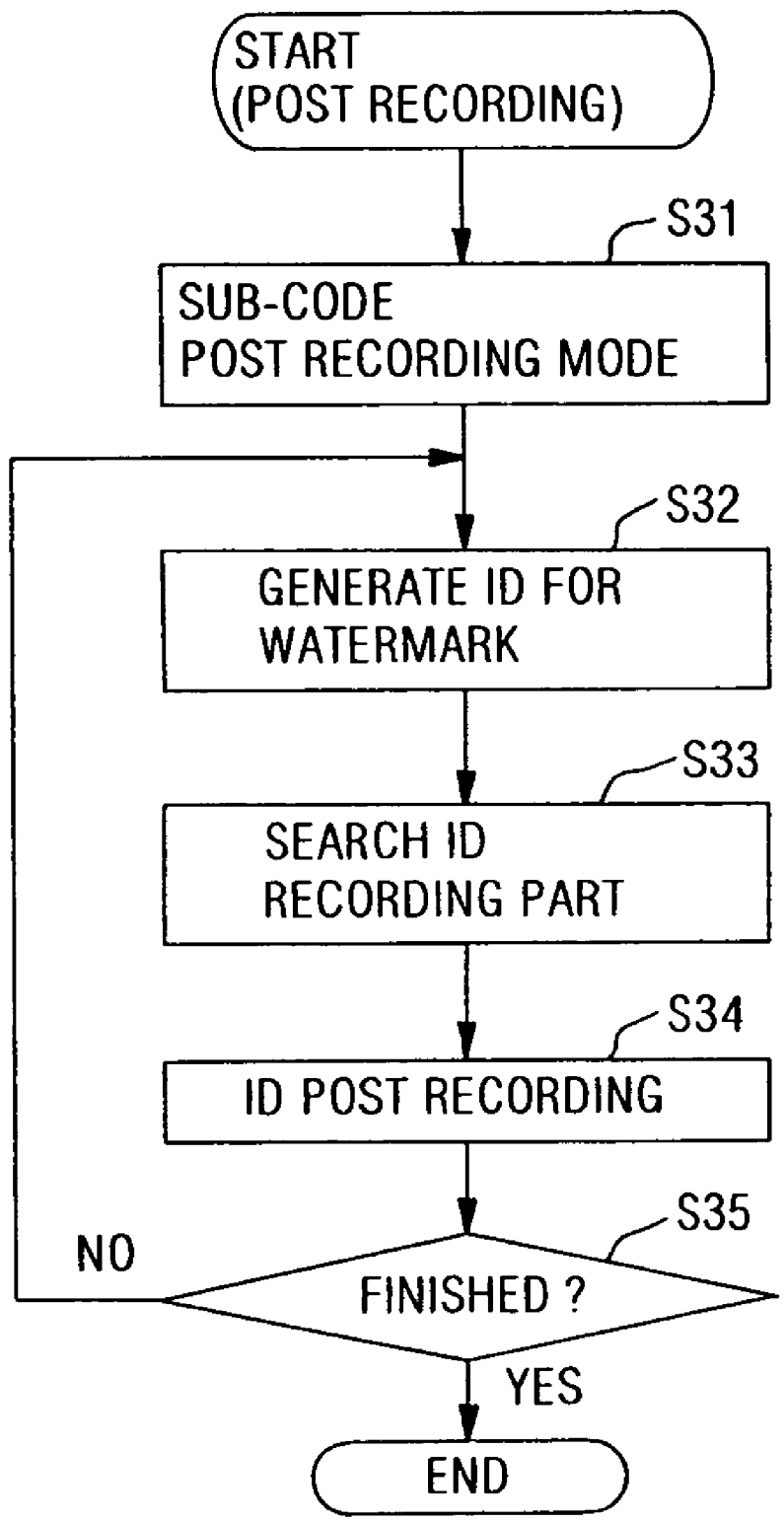
FIG. 7 is a flow chart of post recording operation in the third embodiment.

Next, the flow chart of FIG. 7 showing the flow of the operation in this embodiment will be described. FIG. 7 relates to postrecording operation for watermark information ID. In FIG. 7 the operations of reproduction of image and ID and of the transmission are the same as those in FIG. 5B. Thus, the description of such operations will be omitted.

First, the image recording and reproducing device enters a sub-code postrecording mode. In the sub-code postrecording mode, the watermark ID is postrecorded on sub-code areas with respect to image data recorded. Then in step S32, watermark information ID including information of works and the like required by user were generated by ID generation circuit 7, continuously or in desired timing or in accordance with required image positions.

Then after searching ID recording part of a magnetic tape in steps S33, the watermark information ID generated are postrecorded on sub-code areas of the magnetic tape in step S34. When the postrecording terminated in step S34 at optional positions, the recording and generation of ID are also terminated. When postrecording is once completed, it is judged whether the postrecording mode is to be terminated or continued for other postrecording of ID on other image positions. When completed, the flow stops at step S35, and when not completed the flow returns to step S32.

Another embodiment of the present invention will now be described.

Figure 10:
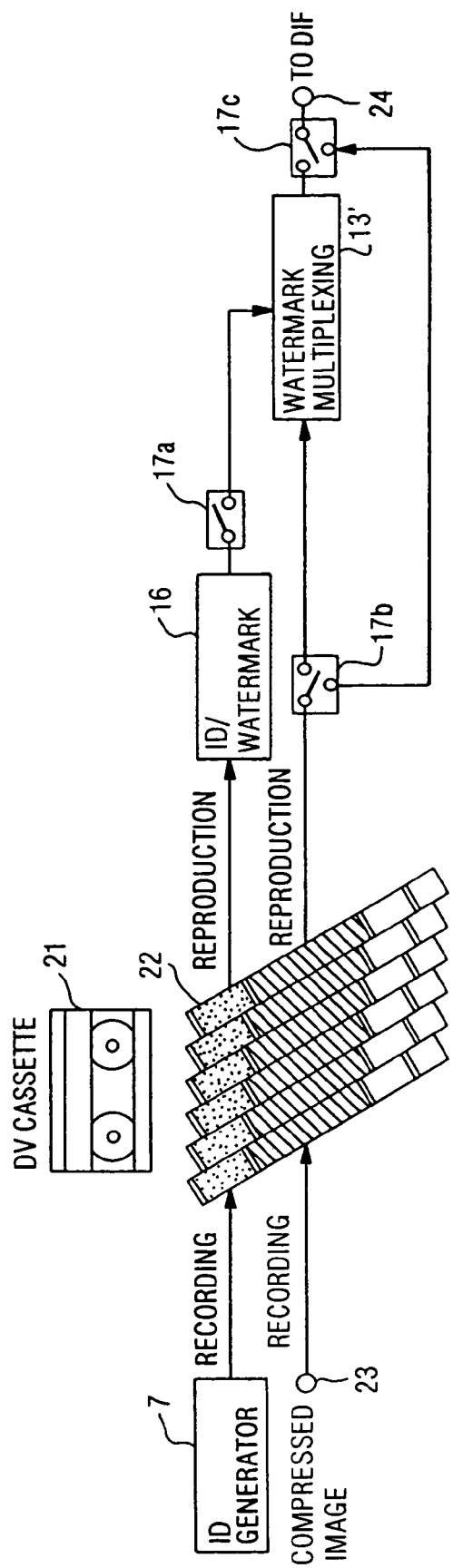
FIG. 10 is a constitutional view schematically showing the main portion of another embodiment using a magnetic tape as a recording medium, according to the present invention.
Figure 20:
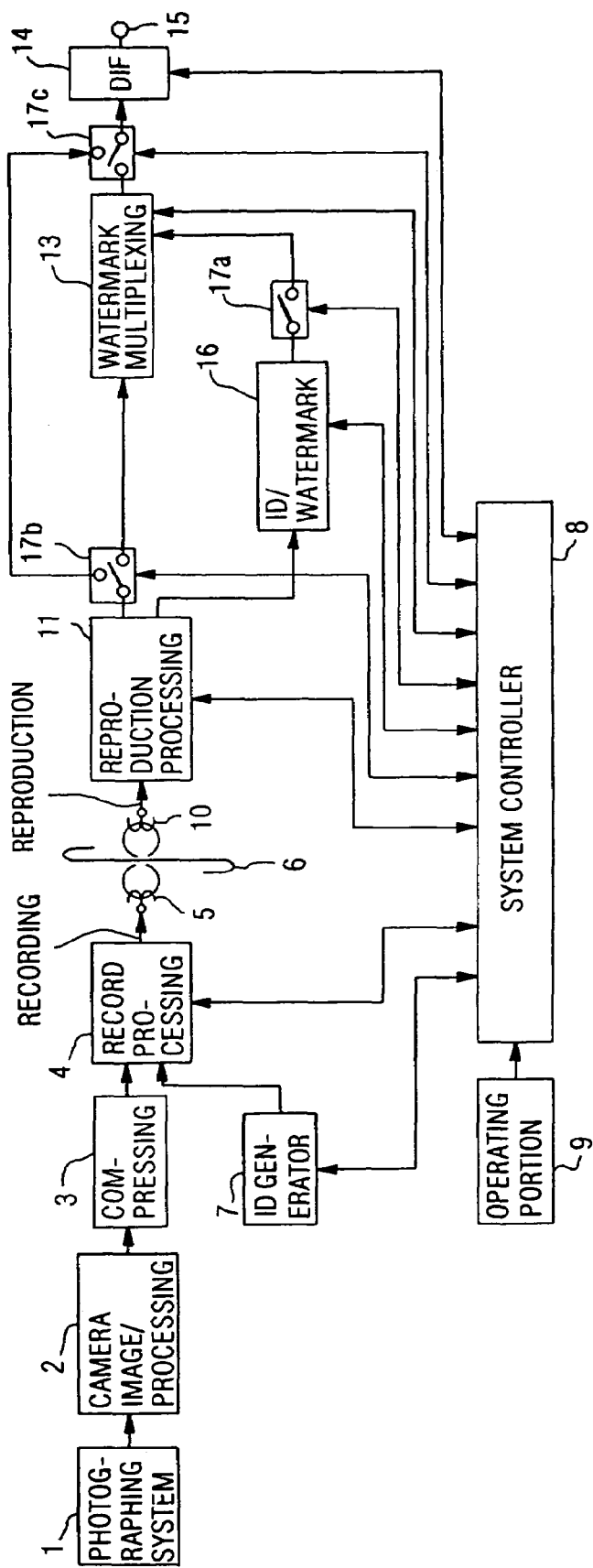
FIG. 20 is a block diagram of an image recording and reproducing device of an embodiment according to the present invention.

In this embodiment, it will be discussed how the ID is buried as watermark information without expanding the compressed image data reproduced from recording medium. FIGS. 20 and 10 are block diagrams in which elements having the same functions as in FIGS. 1 and 2 are denoted as the same reference numerals as those therein and the descriptions thereof are omitted.

A watermark multiplexing portion 13' shown in FIG. 10 multiplexes watermark information without expanding reproduced signals. A method of multiplexing of such watermark information in the watermark multiplexing portion 13' is different from a method of multiplexing of expanded watermark information in the above-mentioned compressing/watermark multiplexing portion 13. Thus the multiplexing of watermark information in the portion 13' expanded use a multiplexing method suitable for compressed image. For example, the watermark information is buried in compressed information having high-frequency component invisible to human.

Figure 11:
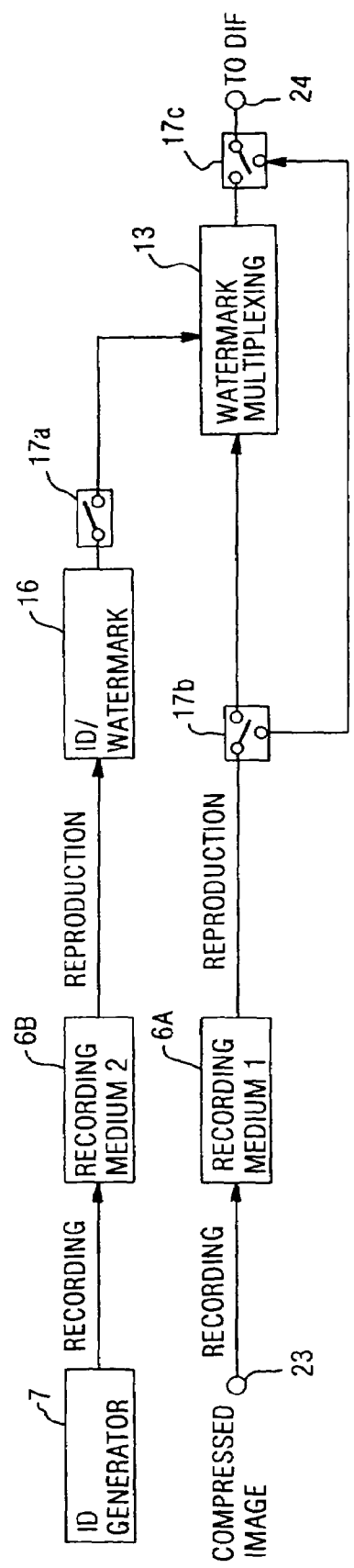
FIG. 11 is a constitutional view schematically showing the main portion of another embodiment using a plurality of recording mediums, according to the present invention.
Figure 12:
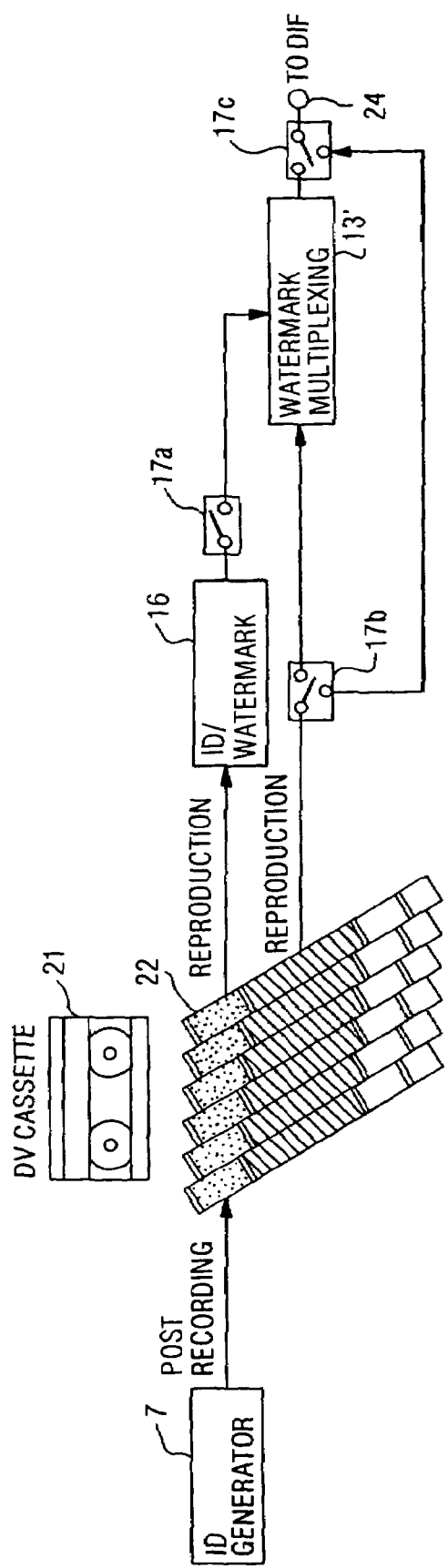
FIG. 12 is a constitutional view schematically showing the main portion of another embodiment in which post recording is performed, according to the present invention.

FIGS. 11 and 12 are modifications of FIGS. 4 and 6, respectively. Elements having the same functions as in FIG. 4 are denoted as the same reference numerals as those therein and the descriptions thereof are omitted.

Figure 14:
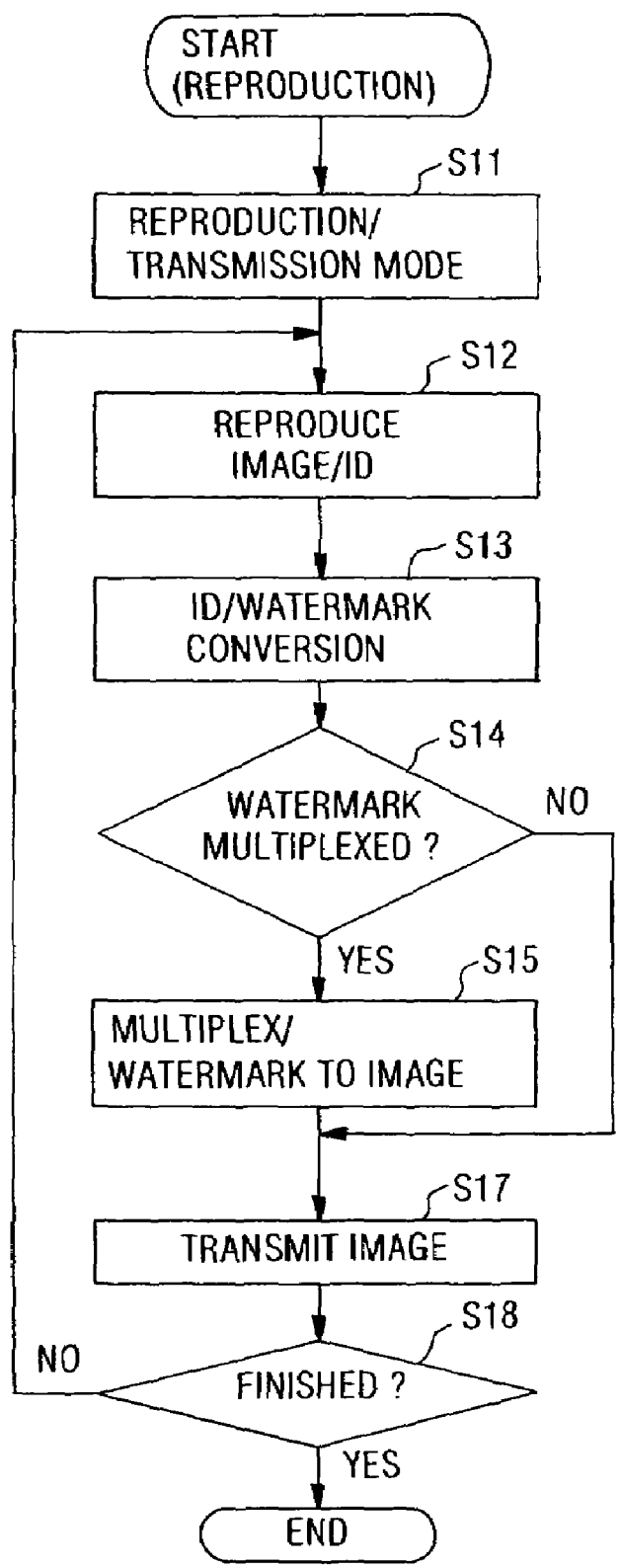
FIG. 14 is a flow chart for explaining the reproduction and transmission operations in the first embodiment.

Further, FIG. 14 is a modification of the flow chart shown in FIG. 5B. In FIG. 14 a step S15', in which watermark information is buried in reproduced, compressed image without performing the expansion processing, is provided in place of step S15 and step S16 in FIG. 5B.

According to the present embodiment, since the watermark information are multiplexed without expanding compressed image information, the multiplexing processing is more simple than the previously described embodiments.

An embodiment which uses a disc recording medium as a recording medium in the block diagram of FIG. 20 will now be described.

Figure 15:
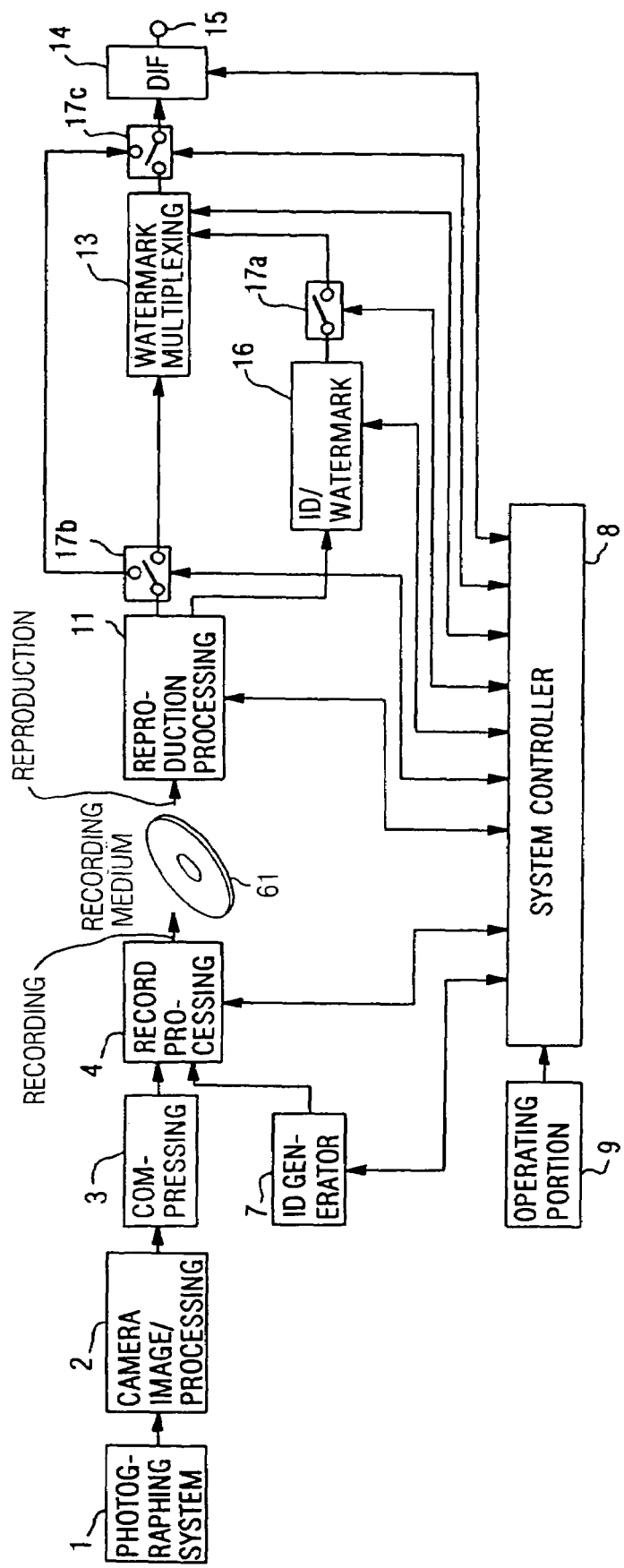
FIG. 15 is a block diagram of an image recording and reproducing device of an embodiment according to the present invention.

FIG. 15 shows a block diagram where the disc recording medium is used. The constitution of the embodiment of FIG. 15 is substantially the same as that of FIG. 20 except that a disc-shaped recording medium 61 is used.

Figure 17:
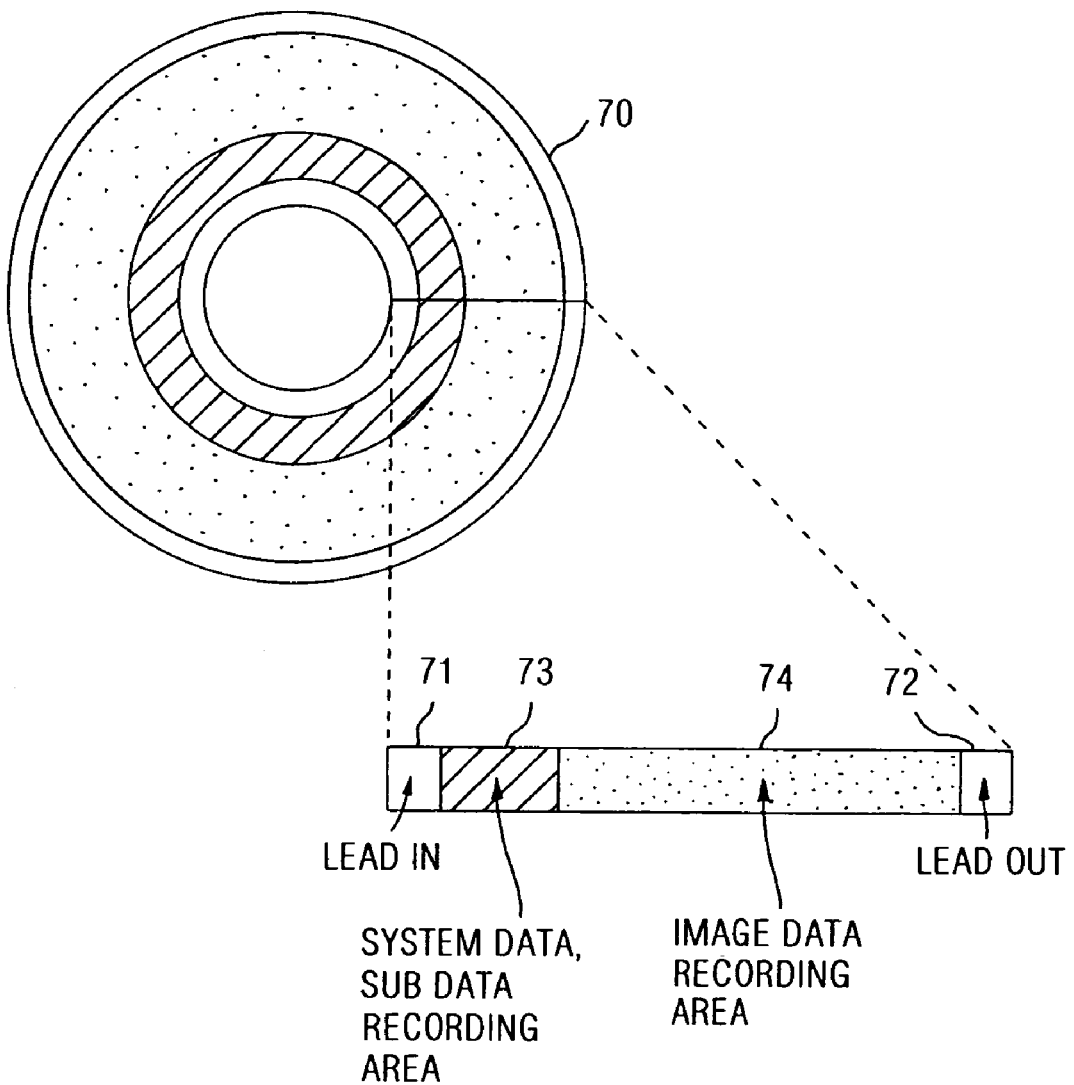
FIG. 17 is a view explaining recorded state of a disc recording medium.

FIG. 17 shows an example of the disc-shaped recording medium (disk 70) which has image data and recording area and a system data, subdata recording area for electronic watermark ID. In FIG. 17, there is also shown the cross section of the disc 70. The cross section of the disc 71 includes divided data recording medium areas. That is, the cross section of the disc 71 consists of, from inside, LEAD IN 71, a system, subdata system recording area 73, image data recording area (main area) 74, and LEAD OUT 72. In this disc 71, electronic watermark ID data are recorded on the subdata recording area 73, and images are recorded on the image data recording area 74. As the result the same effects as in recording using the magnetic tape can be obtained, thereby realizing the present invention. Method of preparing the image data area and the watermark ID area is not limited to the division of the disc by some circumferential lines and may be obtained by dividing the disc into areas in circumferential direction for image area and ID recording area.

Use of various information for the electronic watermark ID during photographing will be described in reference to FIG. 15.

Figure 16:
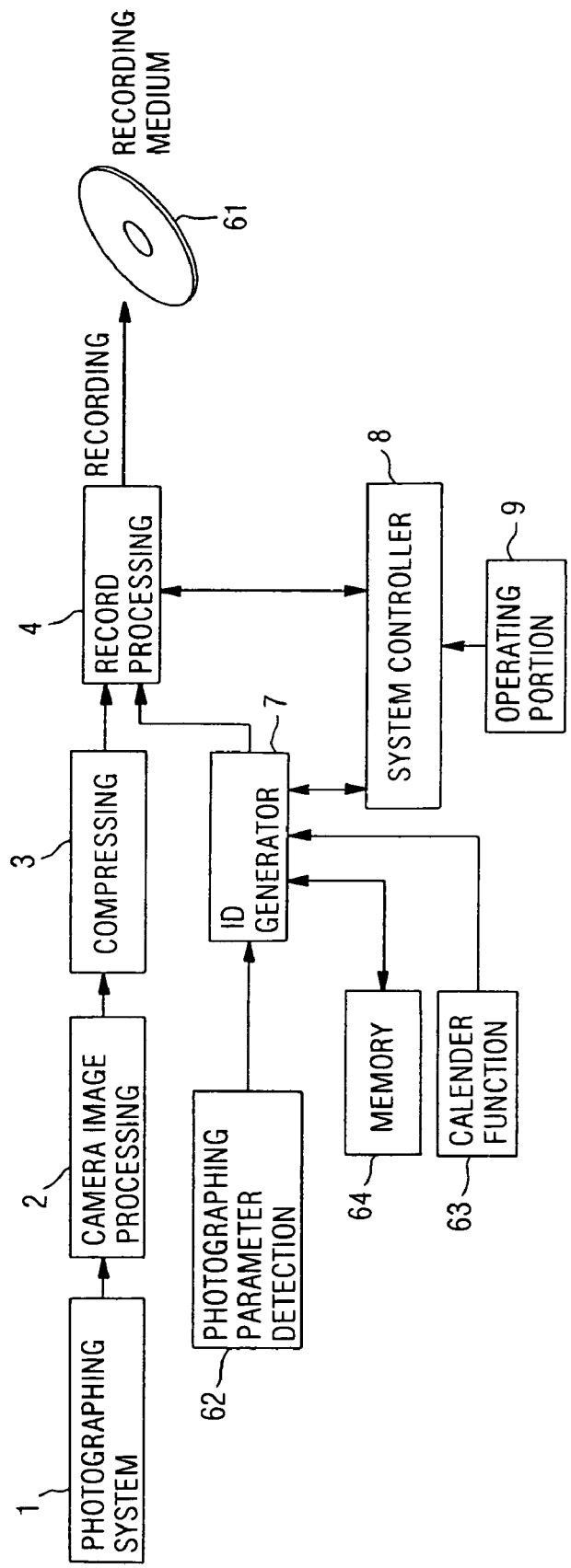
FIG. 16 is a view explaining ID generation in a recording system.

Photographing information includes camera parameters such as shutter speed, zoom, aperture, AE, AWB value etc., time information during photographing, and information representing the user's copyright such as geographic information of a photographing place, character image, private information etc. Such photographing information can be used separately or in combination as the electronic watermark ID. Specifically, as shown in FIG. 16, in addition to recording means shown in blocks in FIG. 15 photographing parameter detecting means 62 which detects various parameters of a photographic system and datas, calendar function portion 63 built in the device, and memory 64 which holds image data and program data such as geographic information, private information, character information etc., can be used for generation of ID. By this constitution, any pattern of selection of the information can be selected by user via operation portion 9. The description of FIG. 16 is contained in the above-explanation.

In the above-described example, a DIF using IEEE serial bus etc. may be used, as explained above.

Data transmission in the DIF and digital video for home use is additionally described. In the home digital video standard, the DIF uses a system based on the IEEE 1394 serial bus standard. The outline of the IEEE 1394 technology will now be described.

Figure 18:
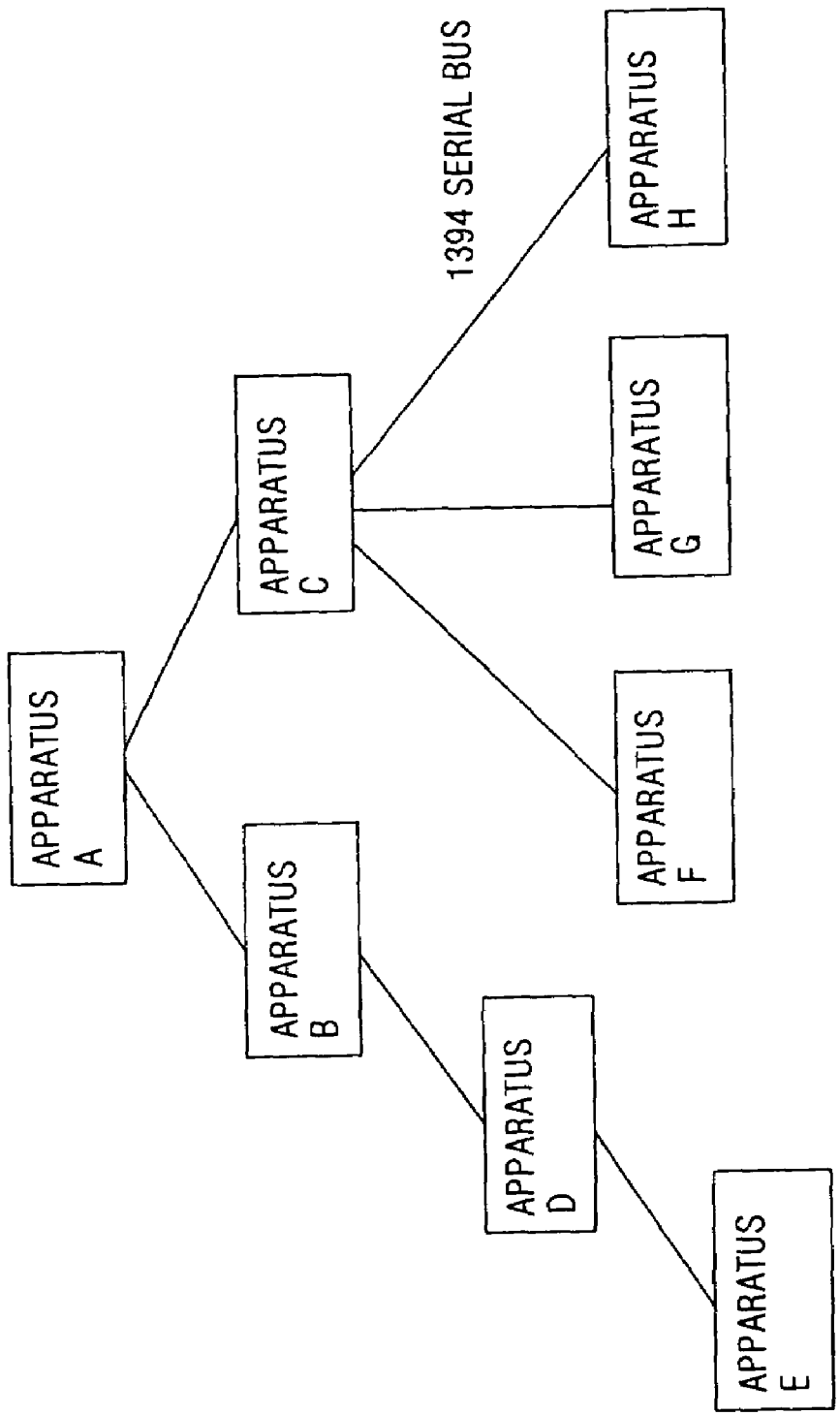
FIG. 18 is a view explaining IEEE 1394.

FIG. 18 shows an example of a network system composed by the use of the IEEE 1394 serial bus. This system includes apparatuses A, B, C, D, E, F, G, and H. Twist pair cables of 1394 serial bus connects between A and B, A and C, B and D, D and E, C and F, C and G, and C and H, respectively. These apparatuses A to H are PC, digital VTR, DVD, digital camera, hard disc, monitor and the like.

The connection method between apparatuses can be a combination of a dasy-chain method and node branched method which provides highly flexible connection.

Further, each of the apparatuses has individual ID so that the apparatuses forming the network connected with 1394 serial buses may recognize each other. By connecting the respective two apparatuses with one 1394 serial bus, the respective apparatuses serves as a relay terminal, thereby integrally forming one network. Recognition of the apparatus and connected state is automatically performed by the Plug & Play function which is features of the 1394 serial bus when a cable is connected to an apparatus.

In the system shown in FIG. 18, when a certain apparatus is removed from the apparatus or a certain apparatus is added to the apparatus, a bus reset is carried out, so that the previously used network structure is reset thereby restructuring new network. By these functions the structure of network can be always set and recognized.

The data transfer speed covers 100/200/400 Mbps and an apparatus having higher transfer speed supports other apparatus having lower transfer speed secure the interchangeability.

The data transfer mode includes an asynchronal transfer mode for transmitting asynchronal data, and an isochronal transfer mode for transmitting isochronal data. The isochronal transfer is suitable for the transfer of real-time data such as video, audio signals and the like. Each data are intermingledly transferred in each cycle (usually cycle: 125 µs) after the transfer of cycle start packet (CSP) which indicates the starting of the cycle and preferentially transmitting the isochronal transfer.

Figure 19:
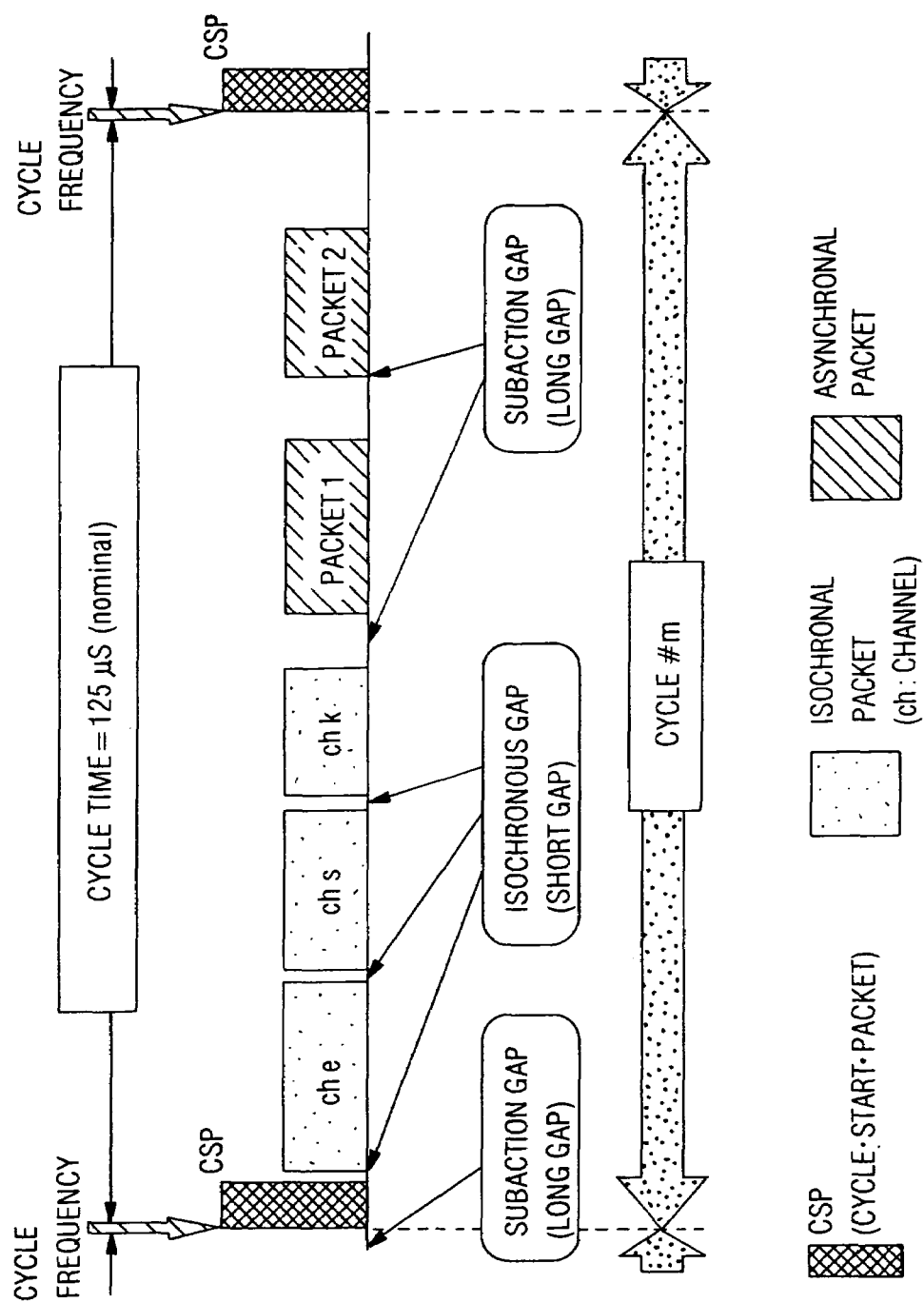
FIG. 19 is a view explaining a transmission mode of IEEE 1394.

FIG. 19 shows transfer conditions on bus with time.

The isochronal transfer is performed preferentially to the asynchronal transfer. The reason is that after the cycle start packet the isochronal transfer can be started with gap length (isochronal gap) shorter than gap length (subaction gap) of the idle time required for starting the asynchronal transfer.

In the general bus cycle shown in FIG. 15, the cycle start packet is transferred from the node called "cycle master" to each of nodes at the starting time of cycle #m. Thus, after performing the time adjustment in each of nodes and awaiting the idle time (isochronal gap), a node to be isochronal transferred enters a packet transfer. As shown in FIG. 19, channels e, s, and k are transferred in the channel unit which separates isochronal data, in the sequence.

Subsequently, after all asynchronal transfers have been completed, asynchronal transfers can be performed. If the idle time reaches a subaction gap where the isochronal transfer can be performed, it is judged that a node to be asynchronal transfer can be transferred.

However, the period when the asynchronal transfer can be performed is limited to a case where the subaction gap to start the asynchronal transfer have been obtained in a period from the completion of the asynchronal transfer to the time (cycle frequency) when the next cycle start packet should be transferred.

In the cycle #m in FIG. 19, the isochronal transfer for three channels and the following asynchronal transfer for two packets (packet 1, packet 2) are being carried out. After this asynchronal packet 2, the time when cycle m+1 should start comes. Therefore, the transfers in the cycle #m are then completed.

However, when the time (cycle frequency) when the next cycle start packets should be transmitted comes during the asynchronal or isochronal transfer operation, the next cycle start packets are transmitted without unnatural interruption of the transfer operation after the transfer completed and awaiting the following idle time. Namely, when one cycle has been continued beyond 125 µs, it is considered that the next cycle is reduced by that time from a base of 125 µs. Thus, the isochronal cycle may be increased or decreased by the base of 125 µs.

However, if necessary, the isochronal transfer is performed in every cycle to maintain the real-time transfer, while the asynchronal transfer is cancelled and moved to the next or later cycle by the reduction of the cycle time. The explanation of the transfer system is completed.

Heretofor, the present invention has been explained with respect to the recording reproduction and transmission device of images (Still or Motion). Time division multiplexing transmission of an image onto which motion pictures and watermarks were multiplexed will now be described as another transmission scheme. In such scheme, while motion pictures are usually produced and transmitted, other images (motion pictures or static pictures) onto which electronic watermarks were multiplexed are output and transmitted. A transmission form when the present invention has been executed with respect to static images recorded mixedly with motion pictures or static images formed from a portion (one frame etc.) of motion pictures, will now be described.

Figure 13:
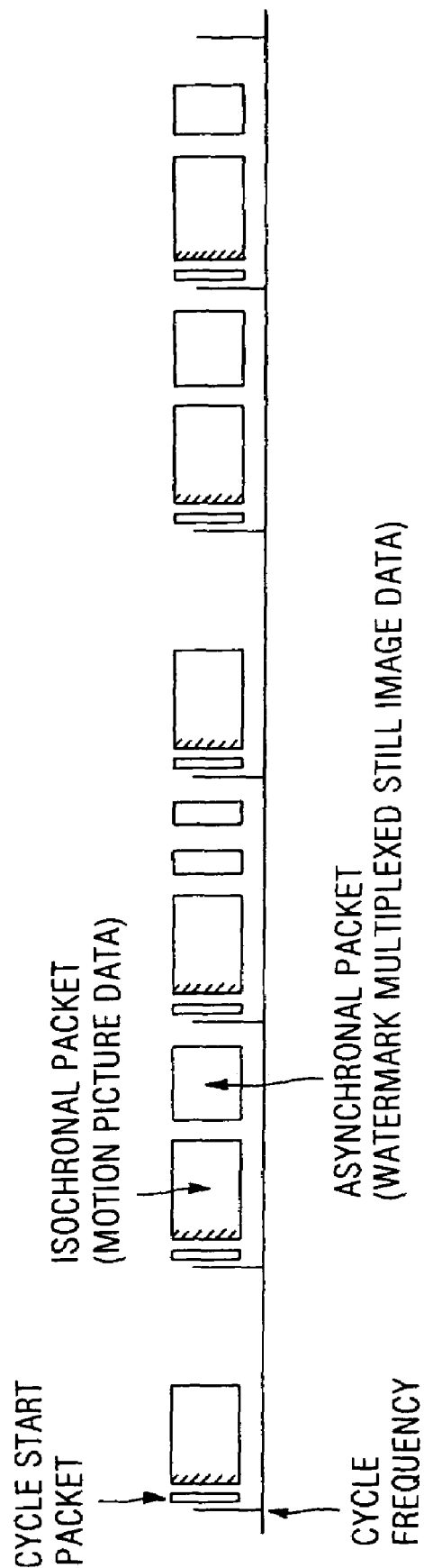
FIG. 13 is a view explaining data transmission mode of an embodiment using IEEE 1394.

Referring to FIG. 13, FIG. 13 shows a transmission form based on IEEE 1394. In FIG. 13, 1394 bus is used as an example of transmission bus. Similar to FIG. 9, the transmission form shown in FIG. 13 has also the cycle frequency, cycle start packet, as well as motion picture data which form isochronal packets as isochronal transmission and electronic watermark-multiplexed static picture data which form asynchronal packets as asynchronal transmission. In this transmission, motion data which are continuously reproduced are transmitted to another node with the isochronal transfer. At the same time, electronic watermarks are multiplexed onto static image data onto which the electronic watermarks which can be appropriately generated is multiplexed in accordance with the first embodiment 1 or 2. The static image data and motion picture are transmitted in parallel on bus by the time divisional multiplexing. Here, the static image onto which electronic watermarks should be multiplexed corresponds to the image portion on which watermark recorded were described in the embodiments 1 and 2. Therefore, even for motion pictures, the watermark-multiplexed images and the usually reproduced motion images can be transmitted by time-divisional multiplexed. As the result the generation and transmission of the electronic watermark image becomes further widely applicable to various apparatuses.

According to the present example, user does not need to bury watermark information in to a master image to be kept and to when the image is output to an external device a watermark (s) can be multiplexed so that a high resolution original image can be maintained. Accordingly, the present invention is effective as the copy right protection technology as well.

Additionally, user can select whether the watermark information is multiplexed onto an image or not. Thus, effective application of the watermark can be expected.

Further, the postrecording of ID can be carried out by separately recording the image data and watermark information data, which realizes the addition of ID to a desired image position or the exchange of previously recorded ID, this makes possible to impart the variety of watermark information to be buried.

Further, since plural kinds of image transmission using different transmission systems can be performed, the watermark can be multiplexed onto an static image which is easily copied and can be transmitted in parrel with the transmission of the motion image.

A method of obtaining electronic information will then be described.

As a method of converting specific information such as the copy right codes and the like to the electronic watermark information hard to recognize, in addition to the methods explained heretofor, there is known a method of introducing, for example, Y (yellow) dots to an image in accordance with the specific information, in printing the image. Alternatively, when using a printer which uses binary dots without forming shading dots, there is also know a method of shifting the dots of Y by only odd number dots or even number dots in response to the specific information "1" or "0". Additionally there is known a method of frequency-modulating the image data in response to the specific information.

The above-described methods are disclosed in Japanese Patent Application Laid-Open No. 5-301380 and No. 6-86049 etc.

The systems shown in FIGS. 1, 2, 4, and 5A and 5B having the respective function blocks, may be formed by hardware or by micro computer systems including CPU, memories and the like. When the system is based on to the microcomputer, the memory forms a recording medium according to the present invention. The recording medium memorizes a program for executing the above-mentioned processing including flow charts in FIGS. 5A and 5B and 7. Alternatively, as this recording medium, a semiconductor memory such as ROM, RAM and the like, an optical disk, an optomagnetic disk, a magnetic medium and the like may be used. Further, the semiconductor memory, optical disk and the like can be used as a CD-ROM, a floppy disk, a magnetic tape, a non-volatile memory card or the like.

As explained above, according to the present example, image data and specific information are recorded on different recording areas, and the specific information reproduced during the reproduction are converted to electric information such as the electric watermark information, which is difficult to recognize. Thus, since only reproduced image data can be separately obtained, the present example can effectively utilized so that only extended definition image data can be obtained and also the electronic information, which is difficult to recognize, is multiplexed onto, for example, image data.

Further, according to the present invention, reproduced image data and electronic information which is difficult to visually recognize are multiplexed, and the multiplexed data and the reproduced image data can be separately output. Therefore, the selection of outputting extended diffinision image data or of outputting image data in which the security such as prevention of unfair copy was obtained can be executed.

Further, the postrecording of only ID can be carried out by generating specific information or by separately recording the image data and specific information data, whereby the addition of ID to a desired image position or the exchange of ID, which was recorded before, can be executed thereby imparting the watermark information buried in an output image to any change.

What is claimed is:

1. A camera device comprising:
   an image capture unit which captures an image;
   an image data generation unit which generates image data corresponding to the captured image;
   a specific information generation unit which generates specific information relating to the image data;
   a recording unit which records the image data and the specific information on a removable recording medium which is removably attachable to said camera device;
   a reproducing unit which reproduces the image data and the specific information from the removable recording medium;
   an embedding unit which controllably embeds the reproduced specific information into the reproduced image data using a digital watermarking technique; and
   a control unit which controls the embedding unit to embed the reproduced specific information into the reproduced image data if a first process is selected by a user, and controls the embedding unit not to embed the reproduced specific information into the reproduced image data if a second process is selected by the user.

2. A camera device according to claim 1, further comprising a decompressing unit which decompresses the reproduced image data,
wherein the embedding unit embeds the reproduced specific information into the reproduced image data decompressed by the decompressing unit.

3. A camera device according to claim 1, further comprising an outputting unit which outputs the image data into which the specific information is embedded to an external device if the first process is selected by a user, and outputs the image data into which the specific information is not embedded to the external device if the second process is selected by the user.

4. A method of controlling a camera device, the method comprising the steps of:
capturing an image;
generating image data corresponding to the captured image;
generating specific information relating to the image data;
recording the image data and the specific information on a removable recording medium which is removably attachable to said camera device;
reproducing the image data and the specific information from the removable recording medium;
controllably embedding the reproduced specific information into the reproduced image data using a digital watermarking technique;
responsive to selection of a first process by a user, embedding the reproduced specific information into the reproduced image data; and
responsive to selection of a second process by the user, not embedding the reproduced specific information into the reproduced image data.

5. A method according to claim 4, further comprising a decompressing step of decompressing the reproduced image data,
wherein the reproduced specific information is embedded into the reproduced image data decompressed in the decompressing step.

6. A method according to claim 4, further comprising the steps of:
outputting the image data into which the specific information is embedded to an external device if the first process is selected by a user; and
outputting the image data into which the specific information is not embedded to the external device if the second process is selected by the user.

7. A computer-readable storage medium storing a computer-executable program for controlling a camera device, the program capable of performing the steps of:
capturing an image;
generating image data corresponding to the captured image;
generating specific information relating to the image data;
recording the image data and the specific information on a removable recording medium which is removably attachable to said camera device;
reproducing the image data and the specific information from the removable recording medium;
controllably embedding the reproduced specific information into the reproduced image data using a digital watermarking technique;
responsive to selection of a first process by a user, embedding the reproduced specific information into the reproduced image data; and
responsive to selection of a second process by the user, not embedding the reproduced specific information into the reproduced image data.

8. A storage medium according to claim 7, wherein the program is capable of further performing a decompressing step of decompressing the reproduced image data,
wherein the reproduced specific information is embedded into the reproduced image data decompressed in the decompressing step.

9. A storage medium according to claim 7, wherein the program is capable of further performing the steps of:
outputting the image data into which the specific information is embedded to an external device if the first process is selected by a user; and
outputting the image data into which the specific information is not embedded to the external device if the second process is selected by the user.

* * * * *